(12) United States Patent
Dold (10) Patent No.: US 8,125,109 B2
(45) Date of Patent: Feb. 28, 2012

(54) MODULAR SAFETY SWITCHING SYSTEM AND METHOD

(75) Inventor: Franz Josef Dold, Furtwangen (DE)

(73) Assignee: Sick AG, Waldkirch (DE)

( * ) Notice: Subject to any disclaimer, the term of this patent is extended or adjusted under 35 U.S.C. 154(b) by 729 days.

(21) Appl. No.: 12/001,995

(22) Filed: Dec. 12, 2007

(65) Prior Publication Data

US 2009/0008232 A1   Jan. 8, 2009

(30) Foreign Application Priority Data

Dec. 20, 2006  (EP) ..................................... 06026381

(51) Int. Cl.
*H01H 23/00* (2006.01)
(52) U.S. Cl. ........................................ 307/326; 307/328
(58) Field of Classification Search ........... 307/326–328
See application file for complete search history.

(56) References Cited

U.S. PATENT DOCUMENTS

| | | | | |
|---|---|---|---|---|
| 5,068,778 A | * | 11/1991 | Kosem et al. ...................... | 700/9 |
| 5,475,583 A | * | 12/1995 | Bock et al. ...................... | 700/12 |
| 5,842,014 A | * | 11/1998 | Brooks et al. .................. | 718/103 |
| 6,311,101 B1 | * | 10/2001 | Kastner ......................... | 700/197 |
| 6,777,830 B1 | * | 8/2004 | Anderson et al. ............. | 307/326 |
| 2003/0058602 A1 | * | 3/2003 | Veil ................................ | 361/166 |
| 2003/0058623 A1 | * | 3/2003 | Veil et al. ...................... | 361/728 |
| 2005/0033848 A1 | * | 2/2005 | Croome ......................... | 709/227 |
| 2005/0063114 A1 | * | 3/2005 | Suhara et al. ................... | 361/62 |

FOREIGN PATENT DOCUMENTS

DE          100 20 075 A1    11/2001

\* cited by examiner

*Primary Examiner* — Fritz M Fleming
(74) *Attorney, Agent, or Firm* — Kilpatrick Townsend & Stockton LLP (57) ABSTRACT

A modular safety switching system (10) with at least one output module (14) and a central control unit (28), which is connected to all output modules (14) via a bus (22). The output module (14) receives input data of at least one sensor (16) or switch (16*a*) and has at least one output (14*b*) for an actuator. The central control unit (28) is designed to receive at least a portion of the input data which is evaluated for the transferring of the output data to the output (14*b*). The output module (14) has its own, dedicated output module control unit (20), which evaluates the input data in collaboration with the central control unit for the purpose of transferring the output data to the output (14*b*). A suitable method is also disclosed.

23 Claims, 3 Drawing Sheets

MODULAR SAFETY SWITCHING SYSTEM AND METHOD

RELATED APPLICATIONS

This application claims the priority of European Patent Application No. 06026381.1 filed Dec. 20, 2006, the disclosure of which is incorporated herein by reference.

BACKGROUND OF THE INVENTION

The invention relates to a modular safety switching system and a safety switching method, as set forth in the preambles of claims 1 and 21, respectively.

In situations when a hazard signal is present, an associated safety switching system must react flawlessly and in a predetermined way. A typical safety engineering application is to protect a dangerous machine, such as a press or a milling machine, and shut it off immediately when operating personnel approach it in an unauthorized manner. Sensors, for example a light barrier or a light grating, are used to detect such approaches. If the sensor detects a hazard, a downstream circuit must generate a shut-off signal in an absolutely reliable way.

In practice a single sensor does not just monitor a single machine. It is typically necessary to monitor a series of hazardous sources. In that case a commensurate number of associated sensors must be configured to define a switching event and to take appropriate measures to eliminate the hazards. In the simplest case it might suffice to react to every switching event with an OR operation. In the case of a machine protected by a light grid behind a protected door which also has an emergency shut-off switch, both the opening of the door and the interruption of the light grid or the actuation of the emergency shut-off switch will trigger a safety measure. However, such a design is not adapted to deal with more complex scenarios.

DE 100 200 75 C2 discloses one conventional possibility for configuring a safety switching device. This device provides a series of input and output modules. Each input module receives data from a sensor, and each output module can actuate an actuator, which switches off the hazardous source. The correct association of sensors to an actuator is based on the positions of the modules arranged in a series and unequivocally determines the associated output module. Thus, these positions define the switching rules. With a selection of modules, it can be determined which sensors are connected to an actuator according to the switching rules. This procedure eliminates the need for programming, but is not adapted to solve complex safety control problems. Therefore, this approach is limited to a narrow range of applications for simple machines.

In a further development of the conventional configuration the modules are connected to a control module, which includes an association table. All of the modules are connected to one another with a bus. Then logic links for deciding whether an actuator shall or shall not be switched occur in the control module. The drawback with this approach is the needed running time for the data communications. As the complexity increases, more and more computing time is needed just for communicating via the restricted data bus.

Such systems have limited utility for time critical applications. In addition, they have to be configured with a high degree of technical complexity and require costly, powerful microcontrollers. Even if the problem of the response time for a specific application can be solved, the solution involves an additional expense or it might be impossible to add an output module to the series of modules.

It is also known in modular safety control systems to communicate the status information of the inputs, the outputs and the logic results to the outside. For this, gateways can be used to couple the series of modules to the external electronics with a field bus or another bus. The status information serves to monitor the functionality of the sensors or to make the sensor data available to the downstream electronics for further evaluations. Here, too, there is the problem that the gateways access the process mapping information of a control module, which fails when the capacity of the control module no longer suffices.

BRIEF SUMMARY OF THE INVENTION

Therefore, the object of the invention is to provide an expandable modular safety switching system, which can variably process even complex arrangements of sensors and actuators.

This object is attained with a modular safety switching system and a safety switching method as set forth in claim 1 or claim 21 respectively. The solution has the advantage that even more complex logic links with differing priorities and relationships are possible. Moreover, it is possible to vary the effect on an actuator with respect to time, or to stop a dangerous movement at a machine with respect to time. Time critical applications are solved with a shorter response time. The user can add units without incurring any expense when, for example, the inputs or the outputs no longer suffice because additional sensors or actuators are added. If additional machine parts are to be protected at a later date, they are readily added to the already configured series of modules.

Since the output modules themselves control actuators assigned to them, the modular construction is promoted. The connections as well as the requisite "intelligence", namely the logic evaluations, can be assembled modularly. Simple and complex evaluation problems can therefore be arbitrarily combined and adapted to new applications without significant effort or expense for the user. Complex monitoring problems can be solved quickly by means of parallel processing in the output module control units and the central control units.

In view of the foregoing, the present invention carries out evaluations needed for controlling the actuator with the shortest possible data paths in order to decrease the response time. More complex evaluations are directly assigned to the causative actuator or its output module. The evaluations are at least carried out in the output module, while the central control unit knows all pending evaluations of the safety switching system and distributes them to the central control unit itself and the output modules for parallel processing.

The output module control unit can preferably be configured for the evaluation. This permits a flexible use of the output module and programming for a plurality of tasks. It does not require changing the series of modules. Instead, they can simply be reconfigured.

The configuration is advantageously stored in a memory unit of the respective output module or in the central memory unit, which is preferably exchangeable. This significantly simplifies the configuration because it cannot be lost and it can be reinstalled by merely exchanging the memory unit. Each output module can have its own memory unit, and the configuration of the memory unit of only the central control unit, or of only some but not all of the output modules, can be exchanged.

The memory unit is preferably connected to the output module control unit or to the central control unit by way of a transponder. This provides a particularly simple and convenient way to exchange the memory unit and, thus, the configuration without contact.

The input data is advantageously input data of a monitoring sensor, which can determine the sizes of the detected objects, the locations of the objects, and/or the movements of the objects as time-dependent signal patterns. This makes it is possible to solve more challenging applications, where sensor data for actuating the actuator must be evaluated in a dynamic manner. One example of such an application is monitoring the shut-off of a machine that experiences a stopping delay, or for differentiating between the classes of events and depending on whether or not they require actuation of the actuator. Other examples include evaluation of a security camera or a light grid, where areas can be dynamically excluded from the field of protection. Such exclusions of well-known, authorized interventions can be the tools with known movement patterns or pallets that pass through.

The sensor is preferably a monitoring sensor such as a laser scanner or a security camera, a light barrier, a light grating or a laser scanner, an emergency OFF switch or a door switch. The actuator is a shut-off device for a machine or a warning system, and the output module control unit can be configured for evaluating one or more of the sensors and/or actuators. In this manner the series of modules covers a wide spectrum of the more customary components that are to be attached.

There is preferably at least one input module which has inputs for the sensors and/or the switches. Each input module is connected to at least one of the output modules with the bus or by way of configurable connections. Input modules can be tailored to the sensor that is to be attached and with its formats can facilitate simple pre-processing steps such as filtering and the like. They can also be used simply to modularly increase the number of output module connections by attaching one or more input modules.

The output module preferably has inputs for the sensors and/or the switches so that the output module can react to the inputs without any loss of time. For especially simple applications, the output module together with the central control unit can even replace the entire series of modules.

The central control unit preferably forms a control module so that based on its space requirement it can be optically integrated into the series of modules without incurring additional costs.

There is preferably a gateway module for connecting the input modules, the output modules and/or the control module to an external bus, in particular a field bus that is connected to an external control. This makes data of the series of modules externally available for testing or display purposes, while the external control unit can perform redundant or additional control tasks. Thus, the series of modules can be integrated in a simple way into a control design. Furthermore, data from the sensor can also be used for evaluations that are not directly related to the actuation of the actuators. This can include, for example, a display of the sensor states.

The external control unit is advantageously designed for the functional testing of the modules and the attached sensors. Checking the safe operation of the device is also a requirement of safety engineering.

The external control unit is preferably designed for externally actuating all or some of the actuators. In this case the actuation is effective only when the central control unit and/or the output module control unit of an output module assigned to the actuator approves the actuation. At least to some extent, the external control unit takes over the actuation of the actuators during normal operation. The safety switching system does not normally affect actuations needed for normal operation. If the safety switching system has detected a safety state of emergency, it can prevent the actuation because its consent is mandatory. It virtually has the last word in order to guarantee safety, but it has nothing to do with the normal operation.

The output module control unit can preferably generate and direct an immediately effective shut-off signal to an assigned actuator. Conversely, a switch-on signal of the output module control unit for the assigned actuator may not become effective until after an enabling signal from the central control unit and/or the external control unit. The shut-off signal is therefore very quickly sent along the shortest path in order to immediately react to a hazard. However, the output module alone cannot decide whether the problem that triggered a hazard has been eliminated. In such a case the output module waits for a signal from a higher ranking control unit. A typical example is an enabling of the system following a previous shut-off, which quite often is not authorized by operating personnel, but instead by a person responsible for the safety by using a password or a key.

The output module control unit is preferably designed for a diversity of or redundant evaluations that are assigned to the central control unit. This helps to accelerate the evaluation and simplifies the construction of the output module control units. A diversity of and/or redundant evaluations reduce possible errors and thereby satisfies the requirements of safety engineering.

The input module, the output module, the central control unit and the bus are made fail-safe in an advantageous way by employing a two-channel design. This feature is a requirement to prevent the failure of the series of modules and enhances safety. The two-channel design constitutes a robust implementation.

The modules are disposed in housings of the same type, each with a plug and a socket for connecting them. Such a housing is especially well adapted for modular constructions and permits a simple expansion or rearrangement at any time.

In one embodiment, the output module control unit and/or the central control unit can be configured with a rotary switch or an operating element. They can be mounted in the housing so that said housing can be manufactured in a compact and simple way while making the operating elements readily accessible for the user.

The output module and/or the central control unit advantageously includes a connection for a mobile telephone, a computer or a PDA for configuring the output module control unit and/or the central control unit with the help of a graphics surface. This allows the user to flexibly design and adapt the series of modules for special applications without the need for an extensive knowledge of their internal construction.

The connection is preferably a permanent connection, like a serial interface or a wireless connection, in particular by way of Bluetooth, wLAN, GSM, UMTS or infrared. These are tried and tested connections, which provide an inexpensive and reliable permanent connection or an especially user friendly wireless connection.

The central control unit and/or the output module control unit preferably include a web server. Web servers are available as complete solutions and offer a convenient and flexible option for the configuration with access via a conventional web browser, instead of proprietary configuration software.

The inventive method can be improved with analogous features set forth illustratively but not restrictively in the following dependent claims which provide similar advantages.

The invention is described in more detail below with respect to other features and advantages and with reference to the embodiments shown in the attached drawings.

DESCRIPTION OF THE PREFERRED EMBODIMENTS

Figure 1:
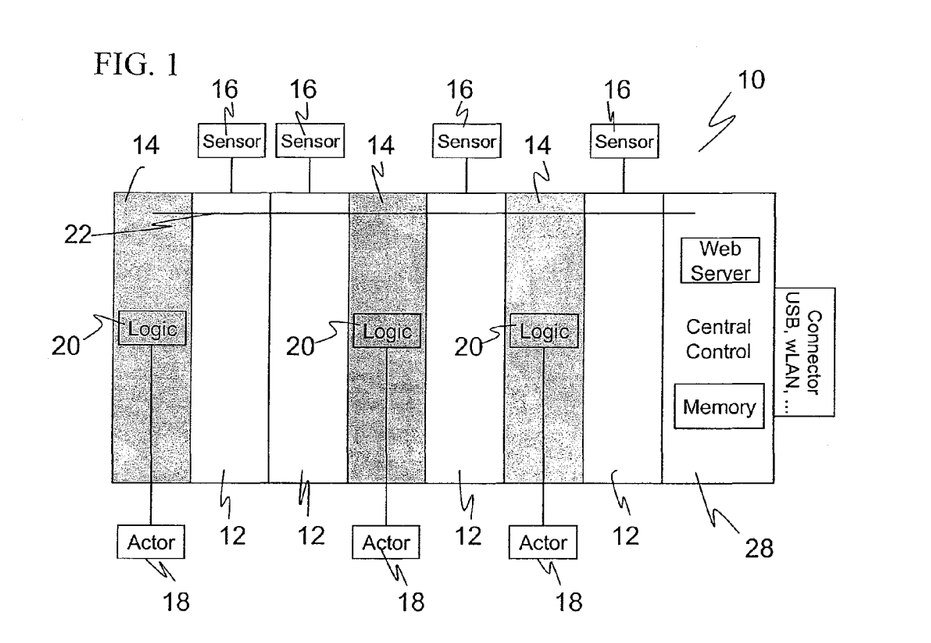
FIG. 1 is a block diagram showing a first embodiment of the safety switching system constructed in accordance with the invention.

A first embodiment of a safety switching system 10 constructed in accordance with the invention is shown in FIG. 1. In this case the safety switching system 10 is constructed, for example, of four input modules 12 and three output modules 14.

Figure 2A:
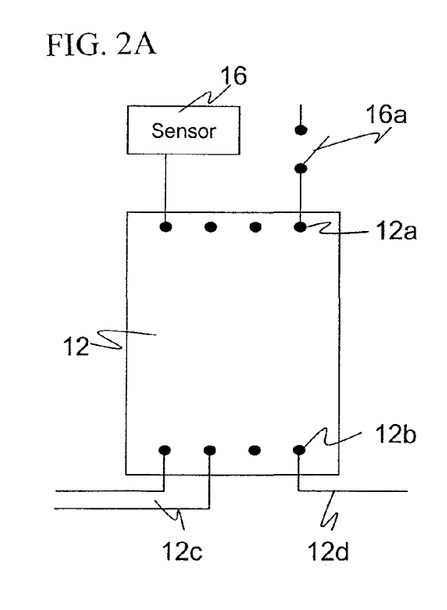
FIG. 2a is a block diagram of an input module with configured modular communication outputs.
Figure 2B:
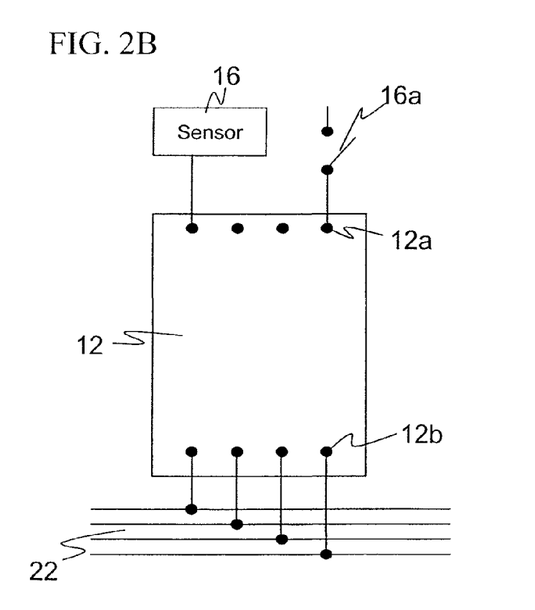
FIG. 2b is a block diagram of an input module with a connection to an internal bus.

Each input module 12 has at least one input with one or more channels and/or with an available connection for one or more sensors 16. The sensor can be a light barrier, a light grid, a laser scanner, a security camera, or a switch such as a door position or an emergency shut-off switch, for example. The input module 12 will be explained in more detail below in conjunction with FIG. 2.

Correspondingly each output module 14 has at least one output with one or more channels for an actuator 18. Actuator 18 can be a robot, a motor, a power line or a machine, such as a milling machine or a press. The phrase "an actuation of the actuator 18" is not limited to its normal operating mode and includes special activations of the safety switching system 10 for moving the actuator into a safe state. It can involve a simple switching off as well as the generation of warning signals or a controlled movement into a safe park position. When the actuator 18 is not actuated, no stoppage is involved and the operation continues undisturbed. Output module 14 is described in greater detail below with reference to FIG. 3. This understanding does not prevent other actuations initiated by or via output module 14 to actuator 18, as is described in more detail below with reference to the additional external control unit shown in FIG. 4.

The input modules 12 are connected to predetermined output modules 14. This association depends on the application, because each actuator 18 is to be actuated as a function of the states of specific sensors 16.

For example, an input module 12 can be connected to an attached monitoring sensor 16, and a second input module 12 can be connected to an attached door position switch 16 on an output module 14, which can place a dangerous machine 18 into a harmless state. This feature would be used in a situation in which the dangerous machine 18 is protected by a door that is to be kept closed and by a monitoring sensor. In such a case each input module 12 can also be connected to multiple output modules 14. For example, the response of the door position switch 16 can be used to switch off the dangerous machine 18 and simultaneously trigger a warning signal via another output module or a second output of the same output module 14.

Alternatively the input modules 12 can also be connected to a bus 22, to which they transmit their data. In this case each output module 14 determines whether the data is relevant for a particular output module 14. Irrespective of whether the data is exchanged over linked connections or over bus 22, the correct association is configured by the user. In simple cases this can be done with rotary switches on modules 12, 14. More convenient and flexible is programming with a programming tool, preferably with a graphics user surface, which is described in greater detail below.

Each output module 14 has a dedicated output module control unit 20 (identified in FIG. 1 as "logic"). The output module control unit 20 evaluates the data from the sensors 16 in order to decide whether the associated actuator 18 is to be actuated. The type of evaluation can be configured. In some cases a simple switching logic is sufficient, for example when the response from just one sensor 16 is sufficient to activate the actuator 18.

However, the majority of the cases are significantly more complex and require that output module control units 20 have sufficient computing capacity. It may therefore be necessary to take into account the feedback from actuator 18 which is monitored by a dedicated sensor 16 and its input module 14.

Another example of complex tasks for output module control unit 20 is the monitoring of motions during which a robot or any other machine is to observe a predetermined motion pattern. If the motion is uncontrolled or too fast, the safety switching system 10 must be able to react immediately. Another case is a monitoring sensor 16 that should not react to only a detection of an object, but that classifies the object according to its size, location or movement. This makes it possible to allow specific penetrations of objects such as known motion patterns of tools or machines, the passage of a pallet, ignoring very slow movements or various manipulations of close-by objects with respect to objects that are farther away from the operating personnel. Other examples are the so-called "muting/blanking" of light barriers or light grids, the monitoring of cam shaft gears of presses or of the speed and/or stoppage of motors. Such monitoring tasks can also be performed with a security camera that delivers large amounts of data that must be evaluated in real time. The complexity increases when the camera has a range resolution capacity and generates a three-dimensional image. To this end not only a stereo camera, but also a triangulating camera or a camera that determines the running time of light, can be used.

To implement this more sophisticated type of evaluation, the output module control unit 20 can be configured to be application specific, so that it solves such complex safety logic function together. Such application-specific solutions can be pre-configured at the plant or they can be offered to the user for configuring the evaluation. The output module control unit 20 is therefore not only able to perform simple logic links, but can also detect more complex, time-dependent signal patterns at the modular communications inputs, can classify the signal patterns and can compare them.

To this end in one embodiment of the invention each output module 14 has a memory module (not illustrated in the Figure). The configuration for the evaluation is stored in the memory module. By simply exchanging the memory module, the output module control unit 20 can be adjusted to perform a completely new task. The data exchange with the memory module can take place via a plugged contact or contactless via a transponder. In an alternative embodiment just one part of the output modules 14, or only a central control unit 28, have such a memory module. In this case the configuration is communicated to the appropriate output modules 14 by way of bus 22.

In addition to input modules 12 and output modules 14, safety switching system 10 includes a central control module 28. Control module 28 is connected via data bus 22 to the inputs of the input modules 12 and the output module control units 20. The output module control units take over all of the evaluations that relate to the associated sensors 16 and the actuators 18 of their output module 14. The control module 28 can give "master" commands, such as an emergency shut-off, to all output modules 14. However, it can also support via bus 22 output module control units 20 for redundant or distributed relieved loads evaluations and assign tasks to the output module control unit. If, for example, the output module control unit 20 of a given output module 14 is overburdened, individual tasks can be assigned to the central control unit 28, or another output module 14, which then return the results.

Control module 28 makes possible a hierarchical control in addition to strictly modular evaluations in the individual output module control units 20. Depending on how time critical and complex the tasks are, the evaluation tasks can then be divided between the control module 28 and the output module control units 20. For this, evaluation rules, evaluations and partial evaluations can be exchanged between output module control units 20 and control module 28. In addition, control module 28 can fulfill other tasks, such as monitoring the functionality of modules 12, 14 with their attached sensors 16 and actuators 18.

The modular communication between the input modules 12 and the output modules 14 can take place, as described above, by means of a configurable association of inputs and outputs. As an alternative, however, all of the modules 12, 14 can be connected to an internal bus 22. In such a case the evaluation rules of the output module control unit 20 determine the associations of input modules 12 and output modules 14 and of sensors 16 and actuators 18. Data selected in this way is forwarded via bus 22 from an input module 12 to the associated output modules 14.

Output module control units 20 of output modules 14 can exchange the evaluation rules via bus 22 and without detouring to control module 28 for their mutual configuration. Logic results, such as intermediate evaluation results, can also be transmitted. In this way a distributed or a redundant evaluation for expediting and/or enhancing security become possible. A sensor 16, such as a security camera, which requires an especially complex evaluation, can be evaluated with multiple output modules 14 and/or their output module control units 20 with the resulting increase in computing power.

In one embodiment of the invention each module 12, 14, 28 is placed in a housing of a common type. The housing can be an IP20 housing system, in which the individual modules are connected together with a rear wall bus as the data bus 22. Alternatively, and depending on the demands placed on the housing, the housing can be conformed to a higher protection class, such as IP65. Each housing is provided with a plug and a socket to interconnect them. In this way a series of modules of the desired construction and length can be plugged together in a simple manner.

Because of its modular construction the safety switching system 10 is readily adapted for new or changing applications. Depending on how many outputs, inputs, logic functions and/or evaluations are required, additional modules 12, 14 can be added to safety switching system 10.

A two-step configuration is necessary in order to adapt to a given application. In a first step it is determined to which output modules 14 the input modules 12 are connected and/or which sensors 16 are to be considered when deciding which actuators 18 are to be switched. In a second step it is determined which evaluation rules each output module 14 uses for the evaluation. For less complicated configurations, rotary switches or other operating elements can be provided on the output modules 14.

As an alternative, a programming tool with a graphics user surface is provided, especially for more complex configurations. The user surface offers graphical displays for a series of components, like the input modules 12 or the output modules 14, which can be assembled and connected into the desired series on the monitor screen. The evaluation rules for the output module control unit 20 are provided for selection on the user surface. They can be linked in the desired manner on the screen and assigned to the output module 14.

The connection to the user surface can be made by attaching a computer, a mobile telephone, a PDA or a similar device on which the programming tool with the user surface runs. The connection can be a permanent connection by way of a serial interface, like RS232 or USB. Alternatively, a wireless connection with Bluetooth, infrared or wLAN can be established. For a simple and user friendly operation, the desired application, that is, the choice and distribution of the specific evaluation rules among the various output modules 14, can be automated with the programming tools. In such a case the user specifies evaluation goals on a relatively high abstraction level, and it is not necessarily seen which modules 12, 14 are needed, how they are to be arranged and how to be configured.

Depending on the experience of the user, the specific implementation in the output module control units 20 as well as the specific allocation to a specific output module 14 can also be performed incrementally and in detail based on experience.

In a preferred embodiment of the programming tool, a dedicated web server is implemented in each output module control unit 20. In such a case the programming tool can be retrieved from a conventional web browser with a computer, a mobile telephone, or a PDA. Hence, a specially configured maintenance and service device is no longer necessary because the specific properties of the programming tool can be implemented in the output module control unit 20 and its web server.

FIGS. 2a and 2b show an input module 12. The same reference numerals refer to the same features here and in what follows. The sensors 16 can be connected to inputs 12a. The sensor can be a real sensor 16 or a switch 16a. Examples thereof were given above. The illustrated input module 12 has four inputs 12a, of which two are used. Of course, embodiments with different numbers of inputs 12a can be used.

In addition, the input module 12 has a number of module communication outputs 12b. As an example, in the embodiment shown in FIG. 2a, two of the four module communication outputs 12b are connected to output modules 14 arranged on the left, and another module communication output 12b is connected to output module 14 on the right. FIG. 2b shows an alternative embodiment, in which the module communication outputs 12b are connected to the data bus 22. Then the assignment to the output modules 14 is determined by the corresponding output module control units 20.

The inputs 12a can also be connected to the data bus 22. In that case all data from sensors 16 and not just data of interest for actuating the actuators 18 is available outside input module 12. This can be used, for example, to check the functionality of the sensors 16 or to indicate their status data.

Figure 3A:
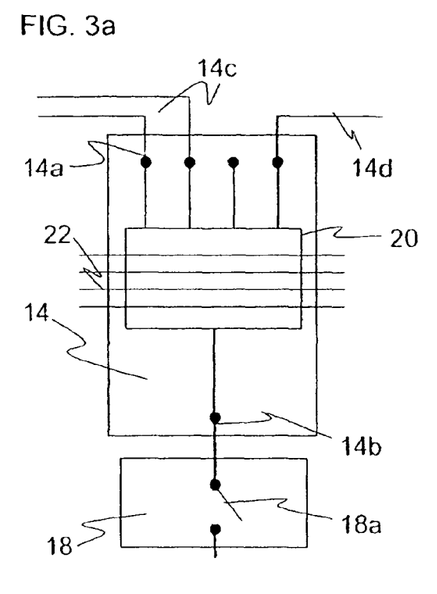
FIG. 3a is a block diagram of an output module with configured modular communication inputs.
Figure 3B:
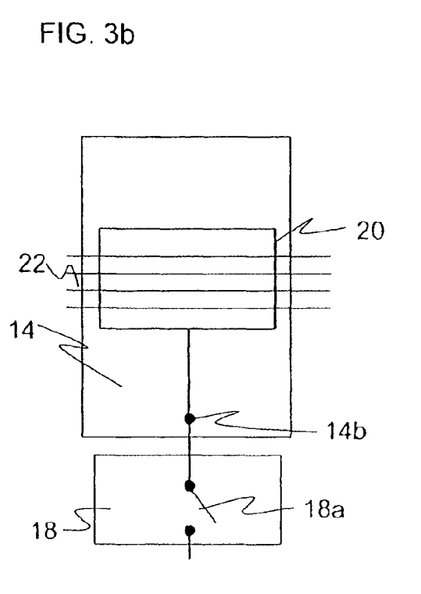
FIG. 3b is a block diagram of an output module with a connection of the sensors by way of an internal bus.
Figure 3C:
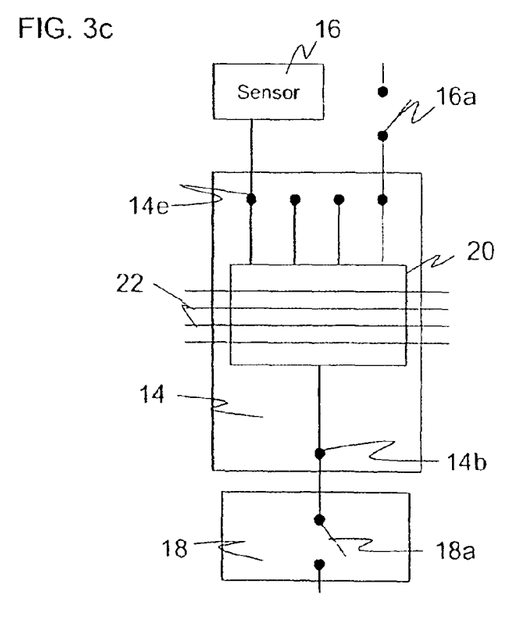
FIG. 3c is a block diagram of an output module with dedicated sensor inputs.

FIGS. 3a-c show an output module 14. Module communication inputs 14a on output module 14 are provided for connection to input modules 12. In the embodiment shown in FIG. 3a, on the left of output module 14 are connections 14c to two input modules 12 and on the right a connection 14d to an additional input module 12. The output module control unit 20 itself is attached to data bus 22 for communications with other output modules 14 and the central control unit 28. In the embodiment of FIG. 3b, the connection to input modules 12 is also over data bus 22, instead of over the direct modular communication inputs 14a.

Output module control unit 20 receives data from the associated input modules 12 (or it selects the necessary data, which are received over the data bus 22) over module communication inputs 14a. Output module control unit 20 is configured in accordance with the requirements for safety products by means of a two-channel microcontroller structure, which performs not only the input and output processing but also the logistical calculations and, if desired, supports data communication with the data bus 22. Since the output module control unit 20 performs only evaluation tasks of its one output module 14, inexpensive microcontrollers can be selected. Exceptions are output modules for especially complex evaluations, such as security cameras, or the provision of a "computing buffer" for the distributed evaluations together with other output modules and/or the central control unit 28. A single-channel safety architecture with a more efficient microcontroller, which performs a variety of internal or redundant or other safety evaluations, can also be used. The appropriate safety requirements for the control category are set forth in the EN 954-1 or ISO 13849 (performance level) standards. The safety levels that can be attained and the other safety requirements required for an application are set forth in the EN 61508 and EN 62061 standards.

The output module control unit 20 determines in accordance with its evaluation rules and association whether actuator 18 should be actuated via output 14b. This is indicated by a switch 18a. The output module 14 is shown with an actuator 18 and its assigned output 14b. It is of course also possible to connect multiple actuators 18 to an output module 14, which is taken into consideration by output module control unit 20.

FIG. 3c shows an embodiment of an output module 14 that is directly connected to a sensor 16 or a switch 16a via dedicated inputs 14e. This permits output module 14 to simultaneously take over the tasks of input module 12. For especially simple applications, output module 14 together with control module 28 can replace the entire row of modules. In a mixed arrangement, module communication inputs 14a can be next to the direct inputs 14e for the sensors. For specific applications the embodiment of FIG. 3c allows one to dispense with one of the input modules 12.

For failure-safe requirements of safety engineering, the inputs and the outputs of the modules 12, 14 are designed fail-safe. One robust and simple implementation of this are two-channel inputs and outputs. In an alternative embodiment, the entire system operates as a one-channel system. In such a case high reliability is guaranteed by means of redundancy or a special layout of the output module control unit 20 and/or the central control unit 28. The switching safety requirements are known and can again be gathered from the earlier mentioned standards such as EN 954-1. If a data bus 22 is used, the bus should be correspondingly reliably designed.

Figure 4:
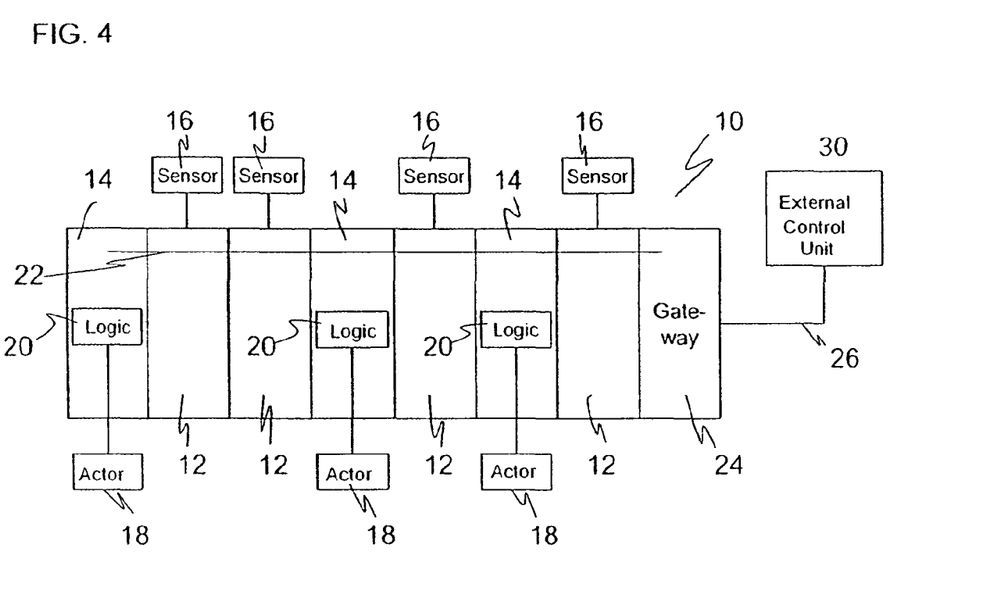
FIG. 4 is a block diagram of a second embodiment of the safety switching system constructed in accordance with the invention with a gateway module for attachment to a field bus.

FIG. 4 shows a further embodiment of the present invention. The difference between this embodiment and the embodiment of FIG. 1 is the additional gateway module 24. The safety switching system 10 can be connected to an external field bus 26 by way of the gateway module 24. The internal data bus 22 is then coupled to field bus 26 by way of gateway module 24 for direct data access to all output modules 14 and/or their output module control units 20, all input modules 12 and/or the data from their attached sensors 16 and control module 28. Alternatively the data bus 22 can also be a field bus. This embodiment simplifies a distributed, decentralized system. The field bus 26 also facilitates communicating the conditions of safety switching system 10 and of all attached sensors 16 and actuators 18 to the outside for evaluating and displaying the condition externally.

In a further embodiment of the invention the tasks or portions of the tasks of the control module 26 are performed by an external control unit 30 connected to field bus 26. This is primarily useful for controlling tasks that do not concern safety and relate to the normal operation of sensors 16 and actuators 18. The external control 30 can continuously control, for example, the operation of a motor as the actuator 18 which is not relevant to the safety switching system 10. However, as soon as an output module 14 associated with an actuator 18, or the central control unit 28, detects a hazard, the actuation from the external control unit 30 must remain ineffective. The actuation of the external circuit 30 therefore requires approval from output module 14 and/or central control unit 28. Such approval can come, for example, from a switch, a logic link or a required approval signal. In that event the communication takes place between output module 14, central control unit 28 and external control unit 30 over field bus 26 and gateway module 24 and/or internally via data bus 22.

Data from the sensors 16 and actuators 18 can also be sent over these data paths to external control unit 30 for displaying the condition of the system, to configure the system or to test the functionality of the system and/or its components.

For an output module 14 to react very quickly to a hazard, in a preferred embodiment the output module itself switches an associated actuator 18 without any feedback from central control unit 28 or external control unit 30 because they normally do not deal with safety relevant controls. The extremely short switching path enables very fast reactions with shortest response times. However, upon startup or returning to an operating state following such a shut-off event, output module 14 cannot itself decide whether the operation may resume. The event that triggered the shut-off may have affected additional units and must have been deemed eliminated prior to resumption by at least one higher level unit such as central control unit 28 or external control unit 30. It is also possible that a release comes from a person who is responsible for safety. As a result, a switch-on command from output module 14 has an effect on actuator 18 only after the higher level unit has generated a release signal. This can be achieved with an AND link of a first switch-on signal from output module 14 and a second switch-on signal from the higher level unit.

The fast direct shut-off in accordance with the last described embodiment can be advantageously combined with the above-described output module 14 that has the inputs 14e for sensors 16 or switch 16a, because all of the switching paths, including those for receiving the relevant data, are then special and ensure an especially short response time.

The distribution of the individual logistic tasks among the output modules 14 results in small logistic units (logic evaluation modules) capable of solving even complex system problems of low technical complexity while ensuring low production costs. This results in high granularity that at any time allows use of those components that are optimal, namely sensors 16 and actuators 18, to make use of the advantage and efficiency of the programmable modular safety switching system 10 with its simple restructuring and expansion options.

The present invention reduces the high costs of conventional prior art modular safety switching systems for minor tasks to a reasonable level. Thus, with just one modular system the user can solve the safety tasks of his wide machine spectrum. The spectrum extends from simple safety functions, such as a simple emergency shut-off, to complex, intertwined safety functions, such as access protection with laser scanners or stoppage monitoring of motors. It is not necessary to install a plethora of technologies, train personnel or service the technologies, which reduces personnel costs, avoids application errors and reduces the inventory. The safety switching system 10 can handle at optimal costs applications ranging from safety relays all the way to freely programmable control systems.

Another advantage attained with the present invention is the reduced response time of the system. Time critical input signals can be processed directly and optimally with respect to time by output module 14 and can be assigned to actuators 18, which are directly attached. The evaluation, which output module control unit 20 has to perform, is tailored to actuators 18 and can be executed leaner and faster than a central control unit alone can. In addition, the response time is not extended when safety switching system 10 is expanded to include additional modules 12, 14.

Due to parallel processing during the evaluation, the complexity of the system is divided between central control unit 28 and output module control unit 20. But it is also possible to differentiate on the basis of the underlying sensor 16. A security camera requires much local computing capacity, which is provided by one or more output module control unit(s) 20 and central control unit 28. To a large extent time critical operations remain in the immediate vicinity of output module control unit 20. On the other hand, there are "master" evaluations, like a general emergency shut-off, which must be assigned to the central control unit 28. In this manner the evaluation tasks are advantageously distributed for parallel processing.

Even if features of the invention have been described in connection with one embodiment, the invention nevertheless includes other combinations of the described features that are possible. This is particularly true for the modules designed for exchangeability.

What is claimed is:

1. Modular safety switching system comprising a plurality of output modules, a bus and a central control unit connected to all output modules by the bus, each output module being configured to receive input data of a monitoring sensor configured to determine sizes of detected objects, locations of the objects, and/or movements of the objects as time-dependent signal patterns, each output module having at least one output for an actuator, the central control unit being configured to receive at least a portion of the input data and to evaluate the input data, for determining output data for the outputs, wherein each output module includes its own output module control unit for evaluating the input data in collaboration with the central control unit for determining the output data for the outputs, wherein the output module control units and the central control unit are configured to distribute evaluation tasks of the input data to the central control unit and to the output module control units for parallel processing, wherein the distribution of the evaluation tasks comprises directly assigning at least some of the evaluation tasks to at least some of the output modules in such a way as to provide shortened data paths.

2. A safety switching system according to claim 1, wherein the output module control unit can be configured for the evaluation.

3. A safety switching system according to claim 2, wherein the configuration is stored in a memory associated with the output module or the central control unit, and wherein the memory is exchangeable.

4. A safety switching system according to claim 3 including a transponder, and wherein the transponder connects the memory to the output module control units or the central control unit.

5. A safety switching system according to claim 1, wherein the sensor is a laser scanner, a security camera, a light barrier, a light grating or a laser scanner, wherein the actuator is a shut-off device for a machine or a warning system, and wherein the output module control unit is to be configured for evaluating one or more of the sensors and/or actuators.

6. A safety switching system according to claim 1 including at least one input module with inputs for the sensors, and wherein each input module is connected to at least one of the output modules via the bus or via configurable connections.

7. A safety switching system according to claim 1, wherein each output module includes inputs for the sensor.

8. A safety switching system according to claim 1, wherein the central control unit comprises a control module.

9. A safety switching system according to claim 1 including a gateway module forming a connection between the output modules and the control module with an external bus, the external bus being connected to an external control unit.

10. A safety switching system according to claim 9, wherein the central control unit or the external control unit is to functionally test the modules and the attached sensors.

11. A safety switching system according to claim 9, wherein the external control unit is to externally actuate one or more of the actuators, wherein the actuation of a given actuator is effective only if the central control unit and/or the output module control unit of the output module assigned to the given actuator agrees to the actuation.

12. A safety switching system according to claim 9, wherein each output module control unit is to emit an immediately effective shut-off signal to the associated actuator, and wherein a switch-on signal of each output module control unit to the associated actuator does not become effective until the central control unit and/or the external control unit has emitted an enabling signal.

13. A safety switching system according to claim 1, wherein each output module control unit is to provide the central control unit with a diversity of evaluations and/or a redundant evaluation.

14. A safety switching system according to claim 1, wherein the output module, the central control unit and the bus comprise a fail-safe, two-channel design.

15. A safety switching system according to claim 1, wherein each module is disposed in a housing of the same type with a plug and a socket for coupling them together.

16. A safety switching system according to claim 1 including a rotary switch or an operating element for configuring the output module control unit and/or the central control unit.

17. A safety switching system according to claim 1, wherein the output module and/or the central control unit includes a connection for a mobile telephone, a computer or a PDA and a graphics surface for configuring the output module control unit and/or the central control unit.

18. A safety switching system according to claim 17, wherein the connection is a permanent wired or wireless connection.

19. A safety switching system according to claim 1, wherein the central control unit and/or the output module control unit includes a web server.

20. A safety switching method for a series of modules including a plurality of output modules and at least one control module interconnected by a bus, wherein each output module comprises an output module control unit, the method comprising:
- receiving, at the output modules, input data of a monitoring sensor to determine sizes of detected objects, locations of the objects, and/or movements of the objects as time-dependent signal patterns,
- further receiving at least a portion of the input data at the control module,
- evaluating the input data in the control module, and, if the input data are particularly complex, distributing evaluation tasks of the input data between the output module control units and the control module for parallel processing, such that at least some of the input data are evaluated in at least some of the output modules rather than in the control module,
- returning results of the evaluating of the control module to the output modules, and
- switching or not switching actuators based on results of the evaluations.

21. A safety switching method according to claim 20 including configuring the evaluation of the output module control unit and of the control module.

22. A safety switching method according to claim 20 including configuring the evaluation via a mobile telephone, a computer or a PDA with a graphics surface, or with a web server of the output module and/or of the control module.

23. Modular safety switching system comprising a plurality of output modules, a bus and a central control unit connected to all output modules by the bus, the output modules being configured to receive input data of a monitoring sensor configured to determine sizes of detected objects, locations of the objects, and/or movements of the objects as time-dependent signal patterns, the output modules each having at least one output for an actuator, the central control unit being configured to receive at least a portion of the input data and to evaluate the input data for determining output data for the output, wherein the output modules include their own output module control units configured for evaluating the input data in collaboration with the central control unit for determining the output data for the outputs, wherein the output module control units and the central control unit are configured to distribute evaluation tasks of the input data for parallel processing, wherein the distribution of evaluation tasks comprises directly assigning at least some of the evaluation tasks to at least some of the output modules in such a way as to provide shortened data paths, and wherein the output module control units are each configured to emit an immediately effective shut-off signal of the output to an associated actuator based on results of the evaluation tasks.

* * * * *